(No Model.)

W. BURNLEY.
POROUS CELL FOR GALVANIC BATTERIES.

No. 450,354. Patented Apr. 14, 1891.

WITNESSES
H. J. Curtis
A. L. Jackson

INVENTOR
William Burnley
By H. Sturgeon
Atty

UNITED STATES PATENT OFFICE.

WILLIAM BURNLEY, OF NORTH EAST, PENNSYLVANIA.

POROUS CELL FOR GALVANIC BATTERIES.

SPECIFICATION forming part of Letters Patent No. 450,354, dated April 14, 1891.

Application filed October 21, 1890. Serial No. 368,861. (No model.)

*To all whom it may concern:*

Be it known that I, WILLIAM BURNLEY, a citizen of the United States, residing at North East, in the county of Erie and State of Pennsylvania, have invented certain new and useful Improvements in Porous Cells for Galvanic Batteries; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in porous cells for galvanic batteries hereinafter set forth and described, and illustrated in the accompanying drawings, in which—

Figure 1:
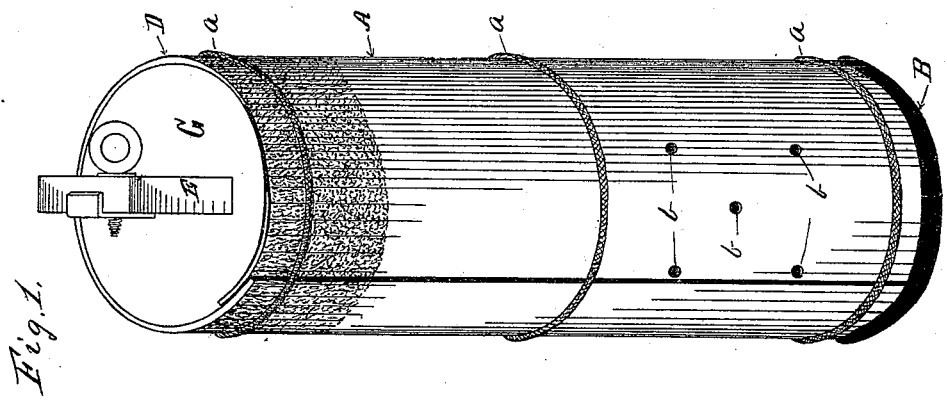
Figure 2:
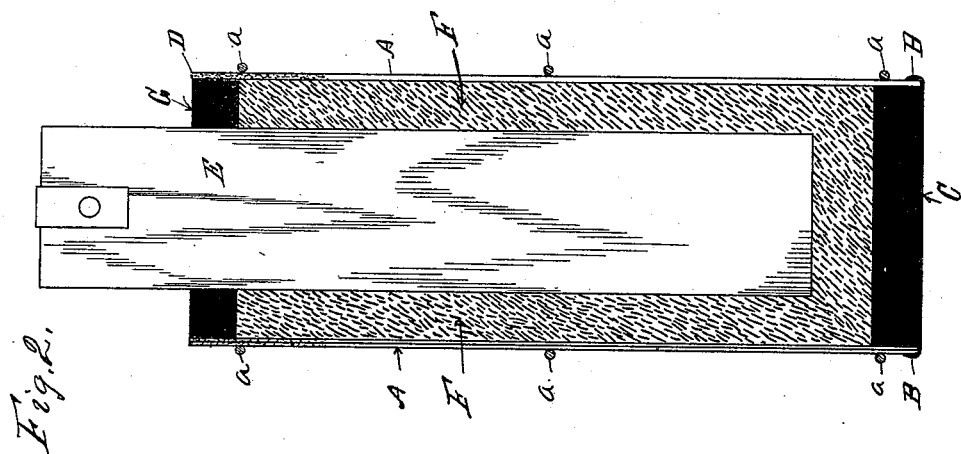

Figure 1 is a perspective view of my improved porous cell. Fig. 2 is a vertical section of the same.

The object of my invention is to construct a cheap porous cell for galvanic batteries of a cylindrical section of ordinary pasteboard or of thin wood veneer rolled around a form and tied with cords or otherwise conveniently secured, having the lower end thereof closed with a bottom of plaster-of-paris or other suitable material and having a carbon or negative element placed therein surrounded with a suitable depolarizing agent and having the top thereof closed with a seal of paraffine wax, bitumen, or other suitable material.

Other features of my invention are set forth hereinafter in the specification and claims.

In the construction of my improved porous cell shown, A is a cup made, preferably, of a sheet of pasteboard or wood veneer rolled around a form so that the edges overlap and are secured by means of cords *a a a* or in any other convenient manner. This shell A is then removed from the form and the lower end preferably dipped into melted bitumen or other suitable adhesive material, which, when removed therefrom and cooled, leaves a ring B of said bitumen or other adhesive material adhering thereto. I then form a bottom C in the lower end of the shell A, preferably by filling it for a short distance with plaster-of-paris. The upper end of the shell A, I also immerse into a bath of hot melted paraffine wax until an inch or more of the upper end D of the shell is thoroughly saturated therewith. This, however, may be done before the sheets of pasteboard or wood veneer are formed up into shape, if desired. I then place centrally within the shell a carbon electrode E and fill the space around the electrode E, preferably with a mixture of pulverized carbon and pulverized peroxide of manganese F, after which I place a seal G, of bitumen, paraffine wax, or other suitable material, in the upper end D of the shell A.

In the shell A, I preferably make a number of small holes *b*, through which the liquid speedily passes to the interior of the cell when first immersed in a battery-jar. However, these holes serve no special purpose, except to facilitate the starting of the cell into operation when first immersed into the liquid in the battery-jar, as after the liquid has time to otherwise permeate the depolarizing agent F in the cell by passing through the pores in the shell A the holes can be dispensed with.

Having thus fully described my invention so as to enable others to construct and use the same, what I claim as new, and desire to secure by Letters Patent of the United States, is—

1. The combination, in a porous cup for galvanic batteries, of a shell of pasteboard or wood veneer bent into a cup shape and having the upper end thereof saturated with paraffine wax, cords or other suitable fastenings for holding the edges of said shell together, and a seal or bottom secured in the lower end of said shell and small holes through the sides of said shell, substantially as and for the purpose set forth.

2. The combination, in a porous cell for galvanic batteries, of a shell of pasteboard or wood veneer, cords or other suitable fastenings for securing it together, and a seal or bottom secured in the lower end of said shell, a depolarizing agent filling said shell around said negative electrode, and a seal closing the upper end of said shell, substantially as and for the purpose set forth.

3. The combination, in a porous cell for galvanic batteries, of a shell of pasteboard or wood veneer bent into a cylindrical shape and having the upper end thereof saturated with paraffine or other suitable water-proof wax, cords or other suitable fastenings for holding the edges of said shell together, a rim or ledge of bitumen or wax around the lower end of said shell, a seal or bottom secured in the lower end of said shell, with a negative electrode placed centrally in said shell, and the space between said electrode and the sides of the shell filled with a depolarizing agent, and a seal of bitumen or paraffine closing the upper end of the said shell, substantially as and for the purpose set forth.

In testimony whereof I affix my signature in presence of two witnesses.

WILLIAM BURNLEY.

Witnesses:
 JOHN S. RILLING,
 P. A. HIMROD.